United States Patent [19]

Windish

[11] 3,954,028
[45] May 4, 1976

[54] COMPACT PLANETARY DRIVE TRANSMISSION PROVIDING ONE-TO-ONE DRIVE RATIO IN EITHER DIRECTION

[75] Inventor: Willis E. Windish, Pekin, Ill.

[73] Assignee: Caterpillar Tractor Co., Peoria, Ill.

[22] Filed: Nov. 5, 1973

[21] Appl. No.: 412,601

[52] U.S. Cl. ................................ 74/792; 74/789
[51] Int. Cl.² ..................................... F16H 3/44
[58] Field of Search ............ 74/770, 789, 792, 761, 74/769

[56] References Cited
UNITED STATES PATENTS

| | | | |
|---|---|---|---|
| 793,224 | 6/1905 | Perkins | 74/792 |
| 1,131,861 | 3/1915 | Perkins | 74/792 |
| 2,664,765 | 1/1954 | Kelbel | 74/792 |
| 2,690,086 | 9/1954 | Cook et al. | 74/792 |
| 2,959,987 | 11/1960 | Miller | 74/792 |
| 3,374,692 | 3/1968 | Kitch et al. | 74/792 |

FOREIGN PATENTS OR APPLICATIONS

| | | | |
|---|---|---|---|
| 483,514 | 4/1917 | France | 74/770 |

*Primary Examiner*—Samuel Scott
*Assistant Examiner*—Wesley S. Ratliff, Jr.
*Attorney, Agent, or Firm*—Phillips, Moore, Weissenberger Lempio & Strabala

[57] ABSTRACT

A compact low inertia planetary gearing system for use in tandem with a multispeed range transmission provides for transmitting drive to the range transmission in either a forward or a reverse direction with a one-to-one drive ratio in either direction. The drive direction determining gearing system includes input and output gears having an equal number of teeth but which are of differing diameter and thus have teeth of differing pitch. Planet gears which are compound pinion gears each have a first set of teeth engaging the larger diameter one of the input and output gears and each have a second set of teeth of reduced diameter which engage the other of the input and output gears through an idler gear, the teeth of the second set being equal in number to the teeth of the first set but being of finer pitch. A brake selectively locks the planet gear carrier against rotation to provide for drive in one direction while a clutch provides for locking up the several gears against relative rotation to provide for drive through the planetary gearing system in the opposite direction.

3 Claims, 2 Drawing Figures

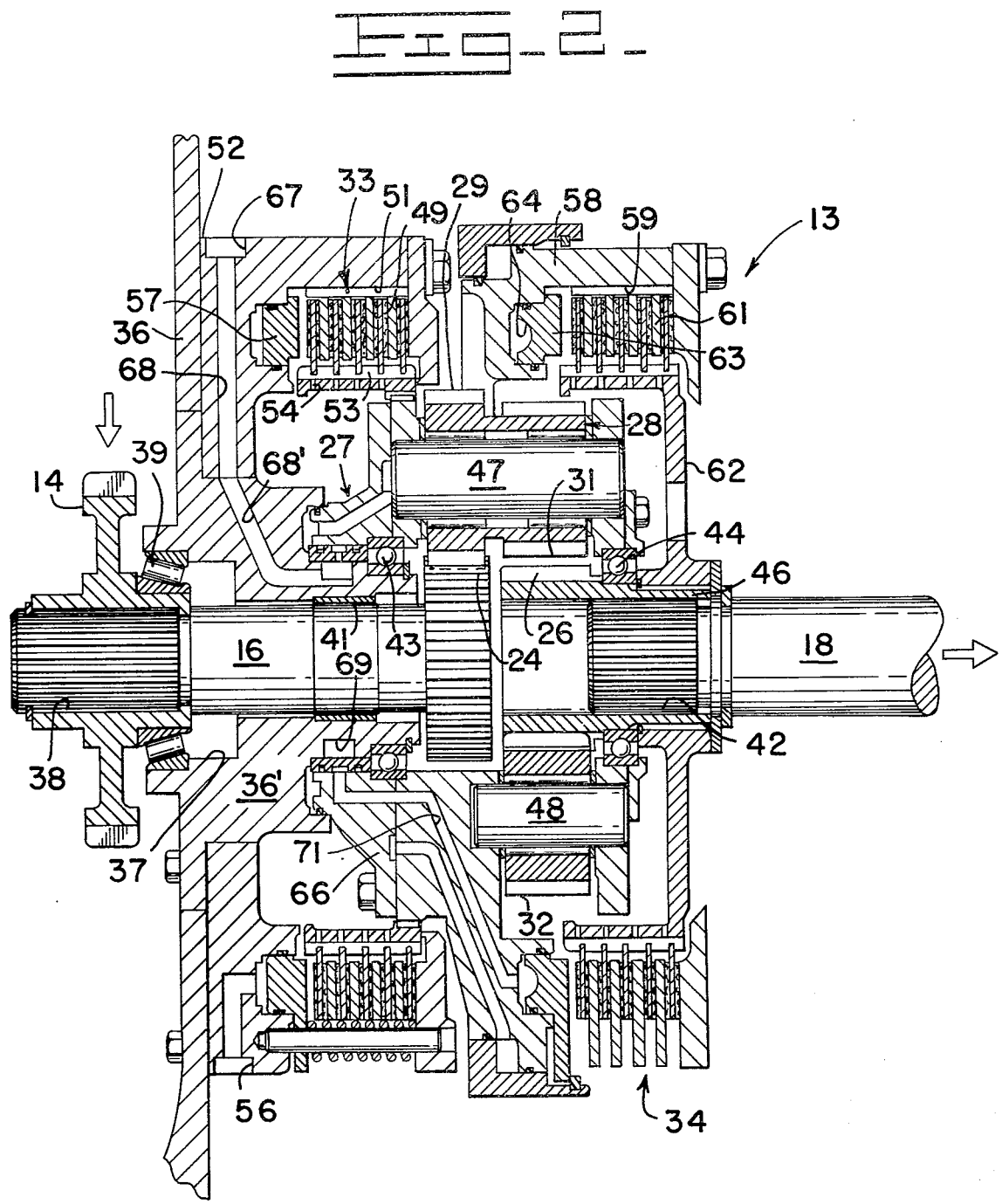

COMPACT PLANETARY DRIVE TRANSMISSION PROVIDING ONE-TO-ONE DRIVE RATIO IN EITHER DIRECTION

BACKGROUND OF THE INVENTION

This invention relates to drive transmissions for transmitting torque from an engine or the like to mechanism which is driven thereby and more particular to planetary gearing systems providing for selective reversal of the drive direction.

Drive transmissions, as used for transmitting torque from the engine to the wheels of a vehicle, for example, typically have a series of internal gears which may be divided into two sections in terms of function, although there may not be a physical separation between the two sections. One section of the total gear system, often termed the range transmission, functions to enable selection of a desired drive ratio. Typically, low, intermediate, high and direct drive speeds may be provided for by the range section of a transmission. The other section may be termed the directional section and may be connected in tandem with the range section to provide for selection of either forward or reverse drive.

In transmissions of the particular class which utilize planetary gearing, reversal of drive direction can be accomplished by utilizing clutches or brakes to lock up all components of a planetary gearing set against relative rotation thereby providing for drive in a first direction while drive in an opposite direction can be provided for by driving a sun or a ring gear and taking drive from the other while braking the planetary carrier. While this is satisfactory for some transmissions, it suffers from the disadvantage that the drive in one direction is at a one-to-one ratio while the drive in the opposite direction is at some other ratio determined by the relative sizes of the components of the planetary gearing set.

In some transmission usages, such as in some forms of earth moving vehicle for example, it is desirable that the same sequence of speed ranges be provided in either forward or reverse direction. This cannot be accomplished with a single conventional planetary gear set of the kind described above. To realize such an objective, it is necessary to add additional gears and other components to the directional section of the transmission. This has undesirable effects in the form of added bulk, weight, cost, and the added inertial load in the power path.

SUMMARY OF THE INVENTION

This invention is a compact economically manufactured and low inertia planetary gearing system for selectively changing drive direction wherein a one-to-one gear ratio is provided in both directions.

The directional gearing systems uses an input and an output gear of different diameters but having the same number of gear teeth which thus are of different pitch. A compound pinion planet gear supported on a planet carrier has a large diameter set of gear teeth engaged with the larger diameter one of the input and output gears and has a smaller diameter set of gear teeth of equal number but of finer pitch engaged with the smaller diameter one of the input and output gears through an idler gear. By locking up all of the gears against relative rotation, one-to-one direct drive through the system in a first direction is realized. By locking the planet carrier against movement, drive in the opposite direction is realized in the same one-to-one drive ratio.

Accordingly, it is an object of this invention to provide a simple, compact economical and low inertia planetary gearing system for selectively providing drive in a forward and a reverse direction with a one-to-one drive ratio in either mode of operation.

The invention together with further objects and advantages thereof will best be understood by reference to the following description of a preferred embodiment taken in conjunction with the accompanying drawings.

BRIEF DESCRIPTION OF THE DRAWINGS

In the accompanying drawings:

FIG. 2 is an axial section view through a directional transmission section of the form depicted schematically in FIG. 1 showing a suitable detailed construction.

DESCRIPTION OF A PREFERRED EMBODIMENT

Figure 1:
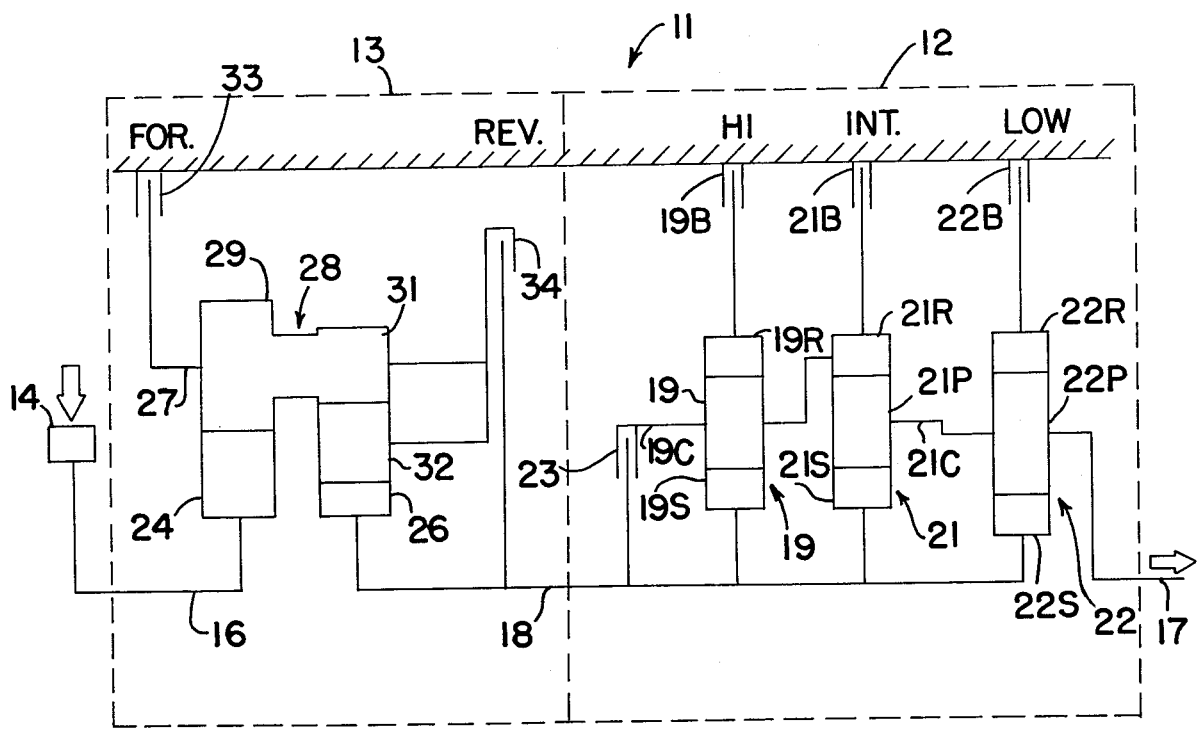
FIG. 1 is a schematic diagram of a vehicle transmission embodying a directional section in accordance with the invention shown connected in tandem with a speed selecting range section.

Referring initially to FIG. 1 of the drawing, a planetary transmission 11 may include a range section 12 connected in tandem with a directional section 13. Rotary drive from a vehicle engine or other source is supplied to the transmission 11 at an input gear 14 which turns an input shaft 16 of the directional section 13. The transmission 11 has a rotatable output element 17 through which drive at a selected speed and in a selected direction may be transmitted to vehicle wheels or other driven mechanism. Within the transmission 11, a single main shaft 18, coaxial with input shaft 16, serves to transmit drive from the directional section 13 to the range section 12 and thus may be considered to be the output means of the directional section as well as being the input means of the range section.

The range transmission section 12 may be of any of various known forms according to the number of separate speed ranges which are desired and in this example, is of the form having three planetary gearing sets 19, 21 and 22 each having a sun gear 19S, 21S and 22S respectively disposed coaxially on main shaft 18 for rotation therewith. Each of the gear sets 19, 21 and 22 also have at least one planet gear 19P, 21P and 22P respectively and each has a ring gear 19R, 21R and 22R respectively. The ring gears of gear sets 29, 21 and 22 may each be individually and selectively locked against rotation by actuation of an associated brake 19B, 21B and 22B respectively, such brakes generally being fluid pressure actuated in response to manipulation of an operator's shift control lever by means well understood within the art.

The planet gear 19P is mounted on a carrier 19C which is linked to ring gear 21R and which may be selectively coupled to mainshaft 18 by activation of a direct drive clutch 23. Planet gears 21P and 22P are mounted on a single planet carrier 21C which is drivingly coupled to the transmission output element 17. Given this range gearing arrangement, activation of brake 22B causes transmission output element 17 to turn at a low speed relative to main shaft 18 while activation of brake 21B causes the output element to turn at an intermediate speed. Actuation of brake 19B causes output element 17 to turn at a relatively higher speed, closer to that of the main shaft 18, while actuation of clutch 23 locks up the components of the range section to cause the output element 17 to rotate at the same speed as the main shaft 18. The direction of such rotation of the output element 17 relative to that of the transmission input gear 14 is controlled with the directional section 13 of the transmission.

Considering now how the directional section 13 provides either a forward or reversed one-to-one drive ratio between input gear 14 and mainshaft 18, the input gear turns an input sun gear 24 through input shaft 16. An output sun gear 26 of lesser diameter is disposed in coaxial spaced apart relationship to sun gear 24 and is coupled to main shaft 18 in driving relationship thereto. Although of differing diameters, both sun gears 24 and 26 have a similar number of gear teeth and this requires that the teeth of the smaller sun gear 26 be of correspondingly finer pitch than the teeth of sun gear 24.

A planet carrier 27 is disposed for orbital motion around the axis of sun gears 24 and 26 and has a compound pinion planet gear 28 rotatively disposed thereon. In practice, as will hereinafter be described, more than one planet gear 28 is usually provided to better distribute torque load and any such additional planet gears may be similar to gear 28. Planet gear 28 has a first set of gear teeth 29 engaged with the teeth of input sun gear 24 and has a second set of gear teeth 31 for transmitting drive to the output sun gear 26 through an idler gear 32. An equal number of gear teeth are provided in both sets 29 and 31 of the planet gear but gear set 31 is of lesser diameter than gear set 29 and thus has teeth of correspondingly finer pitch. As gear teeth set 31 indirectly drives the smaller diameter sun gear 26, the teeth of set 31 must have the same pitch as the teeth of sun gear 26 and the idler gear 32 must also have teeth of this pitch. The large diameter gear teeth set 29 of the planet gear must have the same relatively coarse pitch as the teeth of large sun gear 24.

In the particular example depicted in FIG. 1, both sun gears 24 and 26 are each provided with 27 teeth with the teeth of sun gear 24 having a pitch value of 7 while the sun gear 26 has a pitch value of 8. (In standard nomenclature, a larger pitch value designates a finer pitch. That is, there are more teeth per unit distance along the arcuate surface of the gear.) Both sets 29 and 31 of the pinion gear have 23 teeth but teeth set 29 has a pitch value of 7 in order to engage sun gear 24 while teeth set 31 has a pitch value of 8 in order to drive the idler gear 32 which also has 23 teeth and drivingly engages the smaller sun gear 26.

It will be apparent that differing numbers of teeth and differing pitches may be provided on the several gears as long as the critical ratios and relationships are maintained. That is, both sun gears 24 and 26 must have the same number of teeth but different pitches because of the different diameters and both gear sets 29 and 31 of the pinion gear must have the same number of teeth, but different pitches for the same reason. Gears 24 and 27 must have teeth of the same coarse pitch while gears 26, 31 and 32 must have teeth with a single but finer pitch as dictated by the difference in diameters of gear teeth sets 29 and 31 of the planet gear.

To condition the directional section 13 of the transmission to transmit drive from input shaft 16 to main shaft 18 in a rotational sense wherein the main shaft turns oppositely from the input shaft 16, a brake 33 is provided for selectively stopping orbital motion of carrier 27 around the sun gears 24 and 26. With the carrier 27 locked against orbital motion, planet gear 28 is constrained to rotate in an opposite sense from the rotation of the input sun gear 24. This in turn drives idler gear 32 in the same rotational sense that the input sun gear 24 is driven and therefore the output sun gear 26 is turned in the opposite rotational direction from the input sun gear 24. Further, given the gear teeth ratios described above, this drive is in a one-to-one ratio. In other words, the main shaft 18 is rotated at the same speed as the input shaft 16. That the drive ratio is one-to-one may be seen by multiplying the drive ratios between the three individual sets of engaged teeth intervening between the two shafts. Thus, in this particular example, the drive ratio is equal to 23/27 × 23/23 × 27/23 which equals one.

It may be observed that brake 23 which is actuated to cause shaft 18 to turn in an opposite direction from the rotation of shaft 16, but at the same speed, is designated as the forward drive brake in FIG. 1 notwithstanding the reversal of drive direction. The reason for this is that in the particular vehicle in which this transmission 12 is used, the resultant rotation of the transmission output element 17 is that which produces forward motion of that particular vehicle.

In order to transmit drive to main shaft 18 in an opposite rotational sense but also with a one-to-one drive ratio, that is, in order to cause main shaft 18 to rotate in the same direction as input shaft 16, a rotating clutch 34 is arranged to selectively clamp the planet carrier 27 to mainshaft 18. Thus, activation of the clutch 34, following release of brake 33, locks up the gearing system of directional section 13 to turn as a rigid unit thereby constraining the two shafts 16 and 18 to turn in synchronism.

Accordingly, directional section 13 enables selective realization of a one-to-one drive ratio in either direction utilizing a very simple compact and economical planetary gearing system.

It has not heretofore been common to employ compound pinion planet gears in transmissions largely because of the high cost of manufacturing such gears where the two sets of teeth have similar pitches but differing diameters. In such an arrangement, the individual teeth of the two sets are not in alignment and thus costly machining is required since each set must be individually machined with extreme precision and with careful attention to the relative angular position of the two sets of teeth to insure proper load balance. The compound pinion gears 28 of the present invention are not subject to the same degree of difficulty in manufacture since the same number of teeth are employed in both sets of teeth 29 and 31 and the individual teeth of both sets can be in alignment so that both sets of teeth are readily cut in a single machining operation.

For similar reasons, it is not necessary to provide time marks for reference in assembling the gearing system since the rotational position of the planet gears 28 relative to the gears 24 and 32 engaged thereby may be arbitrarily selected during assembly. This is not the case where two sets of teeth of differing diameter and which are not in alignment are present on a single compound pinion gear.

Considering now one suitable detailed construction for the directional planetary gearing system 13, reference should be made to FIG. 2. The gearing system of the directional section 13 of the transmission may have a housing 36 integral with that of the range section of the transmission and the housing may have a bore 37 in the front wall through which the input shaft 16 extends.

Input gear 14 may be disposed coaxially on shaft 16 outside housing 36 and may be rotationally coupled thereto by splines 38, with a bearing 39 being disposed in bore 37 to journal the input gear and input shaft. Input shaft 16 extends through a re-entrant sleeve portion 36' of housing 36 including a bushing 41 mounted therein and the input sun gear 24 may be formed integrally on the interior end of the input shaft. Mainshaft 18 extends axially from input shaft 16 and the smaller diameter sun gear 26 is carried coaxially at the end of the mainshaft which is adjacent the input shaft, gear 26 being coupled to main shaft 18 for rotation therewith by splines 42. Planet carrier assembly 27 is journaled for rotation about the axis of shafts 16 and 18 by one bearing 43 seated on housing re-entrant section 36' and another bearing 44 seated on a sleeve 46 extending from output sun gear 26. Carrier 27 supports shafts 47 on which the compound pinion gears 28 are rotatably carried in position to maintain gear teeth set 29 in engagement with the input sun gear 24. Carrier 27 also supports additional shafts 48 on which the idler gears 32 are rotatably mounted in position to transmit drive from planet gear teeth set 31 to the output sun gear 26.

Brake 33 may be formed of a plurality of annular disk plates 49 disposed within a chamber 51 of a brake housing 52 and situated in co-axial relationship to the shafts 16 and 18. Disks 49 are coupled to the planet carrier assembly 27 by a spline connection 53 which has passages 54 that enable lubricant to reach the disks for cooling purposes. A port 56 in housing 52 provides for directing pressurized fluid to an annular piston 57 slideably positioned in the housing to exert pressure upon the brake disks 51 in response to such pressurization. Thus, by directing fluid pressure to port 56, piston 57 is caused to clamp the disks 49 and thus the planet carrier 27 to housing 52 stopping orbital motion of the planet gears 29 and thereby causing main shaft 18 to be turned in the opposite direction from input shaft 16 as previously described. Upon release of fluid pressure from port 56, brake 33 disengages and the planet carrier is free to rotate.

Clutch 34 has a rotatable annular housing 58 attached to planet carrier assembly 27 and rotatable therewith, and forming an annular chamber 59 in which a plurality of clutch disks 61 are disposed in coaxial relationship to the shafts 16 and 18. The clutch disks 61 are splined to a hub 62 which is in turn spline coupled to main shaft 18. Rotatable housing 58 carries an annular piston 63 moveable to clamp clutch disks 61 to the housing 58 in response to pressurization of a piston chamber 64. To selectively admit pressurized fluid to the chamber 64, rotatable housing 58 carries a member 66 which extends to transmission housing re-entrant section 36' and which encircles a portion of the re-entrant section. An additional port 67 in brake housing 52 is communicated by a passage 68 with a passage 68' in housing re-entrant section 36' which in turn communicates with an annular groove 69 at the portion thereof encircled by member 66. Member 66 has passages 71 which continuously communicate groove 69 with the piston chamber 64 of the clutch as member 66 rotates about re-entrant section 36'. Accordingly, by directing pressurized fluid to port 67, piston 63 of the clutch 34 is caused to clamp clutch disks 61 to rotatable housing 58 to thereby lock up the planetary gearing system whereby main shaft 18 is constrained to rotate in synchronism with the planet carrier assembly 27 and input shaft 16 as previously described. Release of fluid pressure from port 56 disengages the clutch 34 to enable main shaft 18 to rotate independently of the planet carrier 27 during the alternate mode of operation as previously discussed.

Variations of the above described structure are readily possible. Referring again to FIG. 1, it will be apparent that the rotating clutch 34 may be coupled between planet carrier 27 and input shaft 16 rather than between the planet carrier and main shaft 18 as in the depicted example of the invention. Similarly, the smaller sun gear 26 may be coupled to input shaft 16 if the larger sun gear 24 is coupled to main shaft 18 and the desired one-to-one drive ratios in either direction may still be achieved. Similarly, while the input and output gears of the directional transmission section 13 in this example are sun gears 24 and 26, these may be replaced with ring gears which encircle the planet gears 28 provided the necessary gear teeth relationships as hereinbefore described are preserved.

Thus, many variations of the described structure are possible and it is not intended to limit the invention except as defined in the following claims.

What is claimed is:

1. A transmission including a planetary gearing system providing a reversible one-to-one drive ratio comprising:
   a large diameter gear having a first number of gear teeth of a first pitch,
   a smaller diameter gear disposed for rotation about the same axis as said large diameter gear and having a like number of gear teeth of finer pitch,
   an idler gear engaged with said smaller diameter gear and having gear teeth which are of said finer pitch,
   a planetary gear carrier extending adjacent said large diameter gear and said idler gear,
   at least one compound pinion planet gear disposed for rotation on said carrier and having a first set of gear teeth engaged with said larger diameter gear and being of similar pitch, said pinion gear having a second smaller diameter set of gear teeth engaged with said idler gear, said first and second sets of gear teeth being equal in number but with said first set having said first pitch and said second set having said finer pitch,
   rotary drive input means coupled to one of said large diameter and said smaller diameter gears and rotary drive output means coupled to the other thereof,
   brake means for selectively preventing orbital motion of said carrier and said pinion gear around said large diameter gear to establish drive through said gearing system in a first direction,
   clutch means for locking up said carrier against orbital motion relative to said large diameter gear and said smaller diameter gear to establish drive through said gear system in an opposite direction, and
   a range transmission of the form having input and output elements and means for selecting any of a plurality of drive ratios between said input and output elements, said input element of said range transmission being coupled to said drive output means of said planetary gearing system.

2. The combination defined in claim 1 wherein said range transmission is a planetary transmission having a plurality of sun gears carried on a main shaft, said main shaft being said input element of said range transmission and also being said drive output means of said planetary gearing system.

3. A planetary gearing system providing a reversible one-to-one drive ratio comprising:
- an input shaft and an output shaft disposed for rotation about a single axis,
- a first sun gear carried on said input shaft in coaxial relation thereon for rotation therewith,
- a second smaller diameter sun gear carried on said output shaft in coaxial relation thereon for rotation therewith,
- a planet gear carrier disposed for rotation about said first and second sun gears,
- at least one compound pinion planet gear supported by said carrier for rotation thereon and for orbital motion around said axis and having a first set of gear teeth engaging said first sun gear and having a second set of gear teeth of lesser diameter wherein both said first and second gear teeth are of equal number,
- at least one idler gear carried on said carrier and being engaged with said second sun gear and being engaged with said second set of gear teeth of said planet gear,
- brake means for stopping orbital movement of said carrier around said shafts and clutch means for locking said carrier to one of said shafts to lock up said gears of said planetary gearing system against relative rotation,
- wherein said first and second sun gears have equal numbers of gear teeth and said first and second sets of gear teeth of said planet gear have an equal but smaller number of teeth, and
- wherein said first sun gear and said first set of teeth of said planet gear have teeth of a first pitch and wherein said second sun gear and said idler gear and said second set of teeth of said planet gear have teeth of a second higher pitch value.

* * * * *

UNITED STATES PATENT AND TRADEMARK OFFICE
CERTIFICATE OF CORRECTION

PATENT NO. : 3,954,028
DATED : May 4, 1976
INVENTOR(S) : WILLIS E. WINDISH

It is certified that error appears in the above–identified patent and that said Letters Patent are hereby corrected as shown below:

Column 7, line 2 to
column 8, line 18 - delete claim 3 in its entirety.

Signed and Sealed this

Twenty-sixth Day of October 1976

[SEAL]

Attest:

RUTH C. MASON
*Attesting Officer*

C. MARSHALL DANN
*Commissioner of Patents and Trademarks*